US008822585B2

(12) United States Patent
Bompart et al.

(10) Patent No.: US 8,822,585 B2
(45) Date of Patent: Sep. 2, 2014

(54) AQUEOUS DISPERSION OF POLYMERIC PARTICLES

(75) Inventors: Marc Bompart, Reignier (FR); Ward T. Brown, North Wales, PA (US); Rosemarie P. Lauer, Chalfont, PA (US)

(73) Assignee: Rohm and Haas Company, Philadelphia, PA (US)

( * ) Notice: Subject to any disclaimer, the term of this patent is extended or adjusted under 35 U.S.C. 154(b) by 882 days.

(21) Appl. No.: 11/880,315

(22) Filed: Jul. 20, 2007

(65) Prior Publication Data

US 2008/0058457 A1 Mar. 6, 2008

(30) Foreign Application Priority Data

Aug. 31, 2006 (EP) .................................... 06291398

(51) Int. Cl.
*C08F 2/16* (2006.01)
*C08F 120/56* (2006.01)

(52) U.S. Cl.
USPC .......................................... 524/458; 524/800

(58) Field of Classification Search
USPC .......................................... 524/458, 461, 800
See application file for complete search history.

(56) References Cited

U.S. PATENT DOCUMENTS

| 4,427,836 A | 1/1984 | Kowalski et al. |
| 4,456,726 A | 6/1984 | Siol et al. |
| 4,469,825 A | 9/1984 | Kowalski et al. |
| 4,539,361 A | 9/1985 | Siol et al. |
| 4,554,324 A * | 11/1985 | Husman et al. ............... 525/301 |
| 4,594,363 A | 6/1986 | Blankenship et al. |
| 4,677,003 A | 6/1987 | Redlich et al. |
| 4,880,842 A | 11/1989 | Kowalski et al. |
| 4,970,241 A | 11/1990 | Kowalski et al. |
| 4,985,064 A | 1/1991 | Redlich et al. |
| 5,036,109 A | 7/1991 | Chip et al. |
| 5,157,084 A | 10/1992 | Lee et al. |
| 5,216,044 A | 6/1993 | Hoshino et al. |
| 5,225,279 A | 7/1993 | Redlich et al. |
| 5,264,530 A | 11/1993 | Darmon et al. |
| 5,340,858 A | 8/1994 | Bauer et al. |
| 5,350,787 A | 9/1994 | Aydin et al. |
| 5,352,720 A | 10/1994 | Aydin et al. |
| 5,494,971 A | 2/1996 | Blankenship |
| 5,510,422 A | 4/1996 | Blankenship et al. |
| 5,521,266 A | 5/1996 | Lau |
| 5,527,613 A | 6/1996 | Blankenship et al. |
| 5,545,695 A | 8/1996 | Blankenship |
| 5,703,169 A | 12/1997 | Zajaczkowski et al. |
| 5,989,630 A | 11/1999 | Schlarb et al. |
| 6,020,435 A | 2/2000 | Blankenship et al. |
| 6,139,961 A | 10/2000 | Blankenship et al. |
| 6,252,004 B1 | 6/2001 | Blankenship et al. |
| 6,589,651 B2 * | 7/2003 | Lau et al. ................. 428/355 EN |
| 6,673,451 B2 | 1/2004 | Bardman et al. |
| 7,179,531 B2 * | 2/2007 | Brown et al. .................. 428/407 |
| 7,265,166 B2 * | 9/2007 | Gebhard et al. .............. 523/205 |
| 2001/0009929 A1 | 7/2001 | Blankenship et al. |
| 2001/0036990 A1 | 11/2001 | Bobsein et al. |
| 2002/0028232 A1 | 3/2002 | Kubota |
| 2002/0065360 A1 | 5/2002 | Blankenship |
| 2002/0198328 A1 * | 12/2002 | L'alloret ..................... 525/326.7 |
| 2003/0004258 A1 * | 1/2003 | L'Alloret ........................ 524/500 |
| 2003/0129435 A1 | 7/2003 | Blankenship et al. |
| 2004/0167269 A1 | 8/2004 | Lau et al. |
| 2005/0009954 A1 * | 1/2005 | Gebhard et al. .............. 523/210 |
| 2005/0250887 A1 | 11/2005 | Yang et al. |
| 2006/0052502 A1 | 3/2006 | Zhao et al. |
| 2006/0128916 A1 * | 6/2006 | Schrod ........................... 526/258 |

FOREIGN PATENT DOCUMENTS

| EP | 0520668 A1 | 12/1992 |
| EP | 0658608 A1 | 6/1995 |
| WO | WO 02/22755 A2 | 3/2002 |

OTHER PUBLICATIONS

Campese et al. Braz. J. Chem. Eng. vol. 20 No. 3 (2003).*
Caneba. Free-Radical Retrograde-Precipitation Polymerization. p. 12. 2010.*

* cited by examiner

*Primary Examiner* — Michael Pepitone
*Assistant Examiner* — Michael A Salvitti
(74) *Attorney, Agent, or Firm* — Karl E. Stauss; Cantor Colburn LLP

(57) ABSTRACT

An aqueous dispersion of polymeric particles and process for making the aqueous dispersion are disclosed. The polymeric particles have at least one ethylenically unsaturated monomer and a copolymerized macromer with a number average molecular weight of between 1,000 and 50,000 and a cloud point in water of between 25° C. and 90° C.

18 Claims, No Drawings

AQUEOUS DISPERSION OF POLYMERIC PARTICLES

CROSS REFERENCE TO RELATED PATENT APPLICATIONS

This is a non-provisional patent application of European patent application No. 06291398.3 filed Aug. 31, 2006.

This application claims the benefit of priority under 35 U.S.C. §119(e) of European Patent Application No. 06291398.3, filed on Aug. 31, 2006, the disclosure of which is incorporated herein by reference.

This invention relates to an aqueous dispersion of polymeric particles. More particularly, this invention relates to an aqueous dispersion of polymeric particles having steric stabilizers.

Latex paints often have additives to provide stability. These additives may specifically provide calcium ion stability, solvent shock stability, and freeze/thaw stability, as well as improved gloss, open time, distinction of image ("DOI"), and hiding.

Polymerizable surfactants have been used as additives to latex paints. Use of these surfactants can lend certain advantages to an emulsion polymer, or the film made from it, such as increased divalent ion stability, increased solvent shock stability, improved freeze/thaw stability, higher gloss, and better distinction of image. However, the water-soluble nature of these surfactants make them difficult to incorporate into the polymeric particles formed during an emulsion polymerization, and the unincorporated surfactant leads to water sensitivity for films made from such polymeric particles.

For example, in U.S. Publication Nos. 2006/0052502 and 2005/0250887, polymerizable surfactants were used to improve the stability of emulsion polymers. The surfactants of 2005/0250887 have a low molecular weight (<1000 g/mole), so they are not effective as steric stabilizers. The surfactants of 2006/0052502 do not have a cloud point and so suffer from insufficient incorporation into the polymeric particles.

The present invention seeks to improve upon the current art by providing a method to greatly enhance the incorporation of polymerizable surfactant-like macromers by utilizing copolymerized macromers that have a cloud point below the temperature of the emulsion polymerization reaction, and are therefore not water-soluble during the formation of the polymeric particles.

In a first aspect of the present invention there is provided an aqueous dispersion of polymeric particles, where the particles comprise 80% to 99.9% by weight, based on a weight of the polymeric particles, of at least one ethylenically unsaturated monomer; and 0.1% to 20% by weight, based on the weight of the polymeric particles, of a copolymerized macromer, having a number average molecular weight of between 1,000 and 50,000 and a cloud point in water of between 25° C. and 90° C.

In a second aspect of the present invention there is provided a process for forming an aqueous dispersion of polymeric particles comprising polymerizing from 80% to 99.9% by weight, based on a weight of the polymeric particles, of at least one ethylenically unsaturated monomer and from 0.1% to 20% by weight, based on the weight of the polymeric particles, of a copolymerized macromer; and forming at least a portion of the polymer containing the copolymerized macromer at a temperature above the cloud point. The copolymerized macromer has a number average molecular weight of between 1,000 and 50,000 and a cloud point in water of between 25° C. and 90° C.

The polymeric particles have at least one ethylenically unsaturated monomer and a copolymerized macromer. Suitable ethylenically unsaturated monomers include, for example, (meth)acrylic ester monomers, including methyl acrylate, ethyl acrylate, butyl acrylate, 2-ethylhexyl acrylate, decyl acrylate, lauryl acrylate, methyl methacrylate, butyl methacrylate, ethyl methacrylate, isodecyl methacrylate, lauryl methacrylate, hydroxyethyl methacrylate, hydroxypropyl methacrylate, (meth)acrylonitrile, (meth)acrylamide, acetoacetoxyethyl(meth)acrylate, acetoacetoxypropyl(meth) acrylate, 2-(3-oxazolidinyl)ethyl(meth)acrylate, and tert-butylaminoethyl(meth)acrylate; ethyleneureido-functional monomers; allyl acetoacetate; ethylene; propylene; styrene and substituted styrenes; butadiene; vinyl acetate, vinyl butyrate and other vinyl esters; vinyl monomers, such as vinyl chloride, vinyl toluene, and vinyl benzophenone; and vinylidene chloride. Preferred ethylenically unsaturated monomers include all-(meth)acrylic, predominantly (meth) acrylic, styrene/(meth)acrylic, and vinyl acetate/acrylic, i.e., the polymer composition includes those monomers or classes of monomers. The use of the term "(meth)" followed by another term, such as acrylate or acrylamide, as used throughout the disclosure, refers to both acrylates or acrylamides and methacrylates and methacrylamides, respectively.

The ethylenically unsaturated monomers may include from 0% to 10%, preferably, from 0% to 5%, more preferably, from 0% to 2.5%, and most preferably, from 0% to 1.5%, by weight of a monoethylenically unsaturated acid monomer, based on the weight of the polymer, such as, for example, acrylic acid, methacrylic acid, crotonic acid, itaconic acid, fumaric acid, maleic acid, monomethyl itaconate, monomethyl fumarate, monobutyl fumarate, maleic anhydride, 2-acrylamido-2-methylpropane sulfonic acid, vinyl sulfonic acid, styrene sulfonic acid, 1-allyloxy-2-hydroxypropane sulfonic acid, alkyl allyl sulfosuccinic acid, sulfoethyl(meth) acrylate, phosphoalkyl(meth)acrylates, such as phosphoethyl (meth)acrylate, phosphopropyl(meth)acrylate, and phosphobutyl(meth)acrylate, phosphoalkyl crotonates, phosphoalkyl maleates, phosphoalkyl fumarates, phosphodialkyl(meth) acrylates, phosphodialkyl crotonates, and allyl phosphate.

In some embodiments, the ethylenically unsaturated monomers include from 0.01% to 5%, by weight based on dry polymer weight, copolymerized multiethylenically unsaturated monomers such as, for example, allyl methacrylate, diallyl phthalate, 1,4-butylene glycol dimethacrylate, 1,2-ethylene glycol dimethacrylate, 1,6-hexanediol diacrylate, and divinyl benzene.

The copolymerized macromer is an ethylenically unsaturated monomer generally formed by the polymerization of at least one third monomer, which has a number average molecular weight of between 1,000 and 50,000 and has a cloud point in water of between 25° C. and 90° C. Preferably, the number average molecular weight is between 2,500 and 35,000, more preferably, between 5,000 and 25,000, and most preferably, between 7,500 and 20,000. Preferably, the cloud point is between 27° C. and 85° C. and more preferably, between 35° C. and 70° C.

The copolymerized macromer may be formed by any method suitable for making such a monomer, including, but not limited to, the free radical polymerization of ethylenically unsaturated monomers in the presence of at least one chain transfer agent, where the chain transfer agent contains a reactive functionality X, to make a premacromer, and then post reacting the formed premacromer with an ethylenically unsaturated monomer, which contains a complimentary reactive functionality Y. X and Y will react to form a covalent bond. Suitable chain transfer agents include, for example, aliphatic and aromatic mercaptans, and halogenated compounds. Reactive functionalities X and Y may include, for example, amines and isocyanates, amines and isothiocyanates, amines and acid halides, amines and epoxies, amines and thioranes, amines and acetoacetates, amines and anhydrides, alcohols and isocyanates, alcohols and acid halides, alcohols and anhydrides, carboxylic acids and epoxies, carboxylic acids and thioranes, carboxylic acids and aziridines, carboxylic acids and carbodiimides, acetoacetates and amines, acetoacetates and aldehydes, and aldehydes and acetoacetates, for X and Y, respectively. Examples of pairs of chain transfer agents containing a reactive group X and monomers containing a complementary reactive group Y suitable for making copolymerized macromers include, but are not limited to, 2-aminoethanethiol hydrochloride with 2-isocyanatoethylmethacrylate; 2-(butylamino)-ethanethiol hydrochloride with glycidol methacrylate; 4-aminophenylthiol with methacryloyl chloride; 2,2,2-trichloroethanol with 2-isocyanatoethyl methacrylate; and 3-mercaptopropyl acetoacetate with acrolein.

Further examples of methods suitable for making the copolymerized macromers used in the present invention are any of the living polymerizations known in the art, such as Atom Transfer Radical Polymerization ("ATRP"), Nitroxide Mediated Polymerization ("NMP"), and RAFT ("Reversible Addition-Fragmentation chain Transfer"), which result in a polymer with a reactive functionality X at one end that can be converted into an ethylenic unsaturation, and free radical polymerizations, which result in a polymer having a terminal ethylenical unsaturation such as, for example, when methacrylate monomers undergo free radical polymerization in the presence of Co(II)-(2,3-dioxyiminobutane-BF$_2$)$_2$. Such polymers are terminal with the structure:

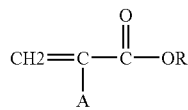

where A is the polymer chain, and R is an alkyl group, which, if they meet the other requirements set forth for the copolymerized macromer, are suitable copolymerized macromers for the present invention.

The copolymerized macromers useful in the present invention have a cloud point in water. Copolymerized macromers useful for the present invention will make clear aqueous solutions at 1% weight solids at 20° C., and have cloud points between 25° C. and 90° C., preferably between 27° C. and 85° C., most preferably between 35° C. and 70° C.

The copolymerized macromer may be any ethylenically unsaturated monomer with a cloud point and molecular weight within the specified ranges. The copolymerized macromer may contain one or multiple ethylenical unsaturations. If the copolymerized macromer contains multiple ethylenical unsaturations, it is preferred that the unsaturations all be terminal at one end of the copolymerized macromer. If the copolymerized macromer contains multiple ethylenical unsaturations which are not all terminal at one end of the copolymerized macromer, it is preferred that the average molecular weight between unsaturations is between 1,000 and 50,000, preferably between 2,000 and 35,000, more preferably between 5,000 and 25,000, most preferably between 7,500 and 20,000. It is preferred that the copolymerized macromer have only one ethylenical unsaturation. It is most preferred that the copolymerized macromer have only one ethylenical unsaturation and that the unsaturation is terminal to the copolymerized macromer. It is preferred that the unsaturation is a (meth)acrylate or has the structure:

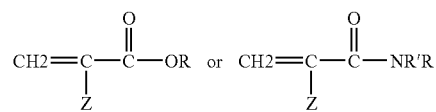

where Z is the polymer chain and R and R' are, independently, H, an alkyl group, or an aryl group.

If the copolymerized macromer is an ethylenically unsaturated polymer, then the polymer can be made from any monomer or combination of monomers which result in a copolymerized macromer that meets the specifications set forth for copolymerized macromers useful in the present invention. The copolymerized macromer may be a homopolymer or a copolymer of two or more monomers. Examples of (meth)acrylic monomers which are useful in making copolymerized macromers suitable for the present invention include, but are not limited to, N-isopropyl(meth)acrylamide, N-isopropyl(meth)acrylamide/(meth)acrylic acid combinations, N-isopropyl(meth)acrylamide/(meth)acrylamide combinations, N-isopropyl(meth)acrylamide/hydroxyethyl acrylate combinations, hydroxyethyl acrylate/hydroxyethyl methacrylate combinations, and hydroxyethyl methacrylate/(meth)acrylamide combinations.

The glass transition temperature ("Tg") of the polymeric particles is from −60° C. to 130° C., preferably from −30° C. to 30° C., most preferably from −20° C. to 20° C.; the Tg being that calculated by using the Fox equation (T. G. Fox, Bull. Am. Physics Soc., Volume 1, Issue No. 3, page 123 (1956)); that is, for calculating the Tg of a copolymer of monomers M1 and M2, $1/Tg(\text{calc.}) = w(M1)/Tg(M1) + w(M2)/Tg(M2)$, where Tg(calc.) is the glass transition temperature calculated for the copolymer w(M1) is the weight fraction of monomer M1 in the copolymer w(M2) is the weight fraction of monomer M2 in the copolymer Tg(M1) is the glass transition temperature of the homopolymer of M1

Tg(M2) is the glass transition temperature of the homopolymer of M2, all temperatures being in K.

The glass transition temperatures of homopolymers can be found, for example, in "Polymer Handbook", edited by J. Brandrup and E. H. Immergut, Interscience Publishers.

The aqueous dispersion of polymeric particles of the present invention is typically formed by an emulsion polymerization process. The emulsion polymerization process may be run as a shot process or by feeding the monomers over time, as is well known in the art. The copolymerized macromer may be introduced into the kettle before the polymerization is initiated, or it may be fed in over time either separately or with the ethylenically unsaturated monomer(s). Alternately, the copolymerized macromer may be added to the reactor near the end of the polymerization, either as a shot or a feed. It is preferred that the copolymerized macromer be introduced into the reactor in the presence of unpolymerized ethylenically unsaturated monomer(s) in such a way that the polymer formed from the copolymerized macromer is a copolymer of copolymerized macromer and ethylenically unsaturated monomer(s).

In certain embodiments, the polymeric polymers include multiple polymers, which may be formed in multiple stages. In such embodiments, the resulting polymeric particles may have any morphology, including, for example, uniform morphologies, core/shell morphologies, interpenetrating networks, multiple lobes, multiple included domains, partially encapsulated cores, and non-spherical shapes.

The polymerization to form the polymeric particles may be conducted at from 10° C. to 100° C. To promote incorporation of the copolymerized macromer, at least some portion of the polymer(s) that contain the copolymerized macromer must be polymerized at a temperature above the cloud point of the copolymerized macromer. If the polymeric particles are multistage particles, then the requirement that the polymerization temperature is above the cloud point of the copolymerized macromer applies only to those stages which include the copolymerized macromer. It is preferred that at least 25% by weight, more preferably at least 50% by weight, yet more preferably at least 75% by weight, and most preferably substantially 100% by weight of those polymer stages which include the copolymerized macromer be polymerized at a temperature above the cloud point of the copolymerized macromer.

The polymerization techniques used to prepare aqueous emulsion polymers are well known in the art. In the emulsion polymerization process, conventional surfactants can be used such as, for example, anionic and/or nonionic emulsifiers such as, for example, alkali metal or ammonium salts of alkyl, aryl, or alkylaryl sulfates, sulfonates or phosphates; alkyl sulfonic acids; sulfosuccinate salts; fatty acids; ethylenically unsaturated surfactant monomers; and ethoxylated alcohols or phenols. The amount of surfactant used is usually 0.1% to 6% by weight, based on the weight of monomer.

Free radical polymerization processes including, for example, thermal, redox, photochemical, and electrochemical initiation may be used for the formation of the polymeric particles. The polymeric particles may be formed using suitable free radical initiators (oxidants), such as, for example, hydrogen peroxide; sodium or potassium peroxide; t-butyl hydroperoxide; t-alkyl hydroperoxide, t-alkyl peroxide, or t-alkyl perester wherein the t-alkyl group includes at least 5 Carbon atoms; cumene hydroperoxide; ammonium and/or alkali metal persulfates; sodium perborate; perphosphoric acid and salts thereof; potassium permanganate; and ammonium or alkali metal salts of peroxydisulfuric acid, typically at a level of 0.01% to 3.0% by weight, based on the weight of monomer. Redox systems using one or more oxidants with a suitable reductant, such as, for example, sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, hydroxymethanesulfonic acid, sodium 2-hydroxy-2-sulfinatoacetic acid, acetone bisulfite, amines such as ethanolamine, glycolic acid, glyoxylic acid hydrate, lactic acid, glyceric acid, malic acid, tartaric acid and salts of the preceding acids may be used. Redox reaction catalyzing metal salts of iron, copper, manganese, silver, platinum, vanadium, nickel, chromium, palladium, or cobalt can be used for the formation of the polymer. Typical levels of catalytic metal salts used in accordance with the invention range from 0.01 ppm to 25 ppm. Mixtures of two or more catalytic metal salts may also be usefully employed. Chelating ligands, which may be used when catalytic metal salts are used, include multidentate aminocarboxylate ligands, such as, for example, nitrilotriacetic acid ("NTA," a tetradentate ligand), ethylene diamine diacetic acid ("EDDA," a tetradentate ligand), N-(hydroxyethyl)ethylene diamine triacetic acid ("HEDTA," a pentadentate ligand), ammonia diacetic acid ("ADA," a tridentate ligand) and ethylene diamine tetraacetic acid ("EDTA," a hexadentate ligand).

Chain transfer agents, such as halogen compounds, such as tetrabromomethane; allyl compounds; or mercaptans such as alkyl thioglycolates, alkyl mercaptoalkanoates, and $C_4$-$C_{22}$ linear or branched alkyl mercaptans, may be used to lower the molecular weight of the polymers, and/or to provide a different molecular weight distribution than would otherwise have been obtained with any free-radical-generating initiator(s). Chain transfer agent(s) can be added in one or more additions or continuously, linearly or not, over most or all of the entire reaction period or during limited portion(s) of the reaction period.

The polymeric particles of the present invention have an average particle diameter of from 20 to 1000 nanometers, preferably from 70 to 600 nanometers, and most preferably from 100 to 300 nanometers. Also contemplated for the polymeric particles are multimodal particle size emulsion polymers, where one or more of the particle size modes are polymeric particles of the present invention and where two or more distinct particle sizes or very broad distributions are provided as is taught in U.S. Pat. Nos. 5,340,858; 5,350,787; 5,352,720; 4,539,361; and 4,456,726.

In certain embodiments, the polymeric particles include, when dry, at least one void. Polymeric particles which include a single void formed by multistage emulsion polymerization are known in the art, such as is disclosed in U.S. Pat. Nos. 4,427,836; 4,469,825; 4,594,363; 4,880,842; 4,970,241; 4,677,003; 4,985,064; 5,225,279; 5,494,971; 5,545,695; 5,510,422; 5,527,613; 6,020,435; 6,252,004; 6,139,961; and 6,673,451. Such polymeric particles are also disclosed in US Publication Nos. 2001/0009929; 2001/0036990; 2002/0065360; and 2003/0129435.

Suitable polymeric particles can also alternatively contain, when dry, multiple voids. Multiple voids can be formed within a polymeric particle fully or partially enclosed by a shell polymer; by "multiple voids" herein is meant two or more voids, whether isolated or connected to other voids, whether substantially spherical in shape or not, including, for example, void channels, interpenetrating networks of void and polymer, and sponge-like structures, such as are disclosed, for example, in U.S. Pat. Nos. 5,036,109; 5,157,084; 5,216,044; and 5,989,630. In alternative embodiments, polymeric particles can include one or more core polymer(s) which can be dissolved out of the polymeric particle to form, when dry, a void. The aqueous dispersion of polymeric particles typically has a solids content of greater than 25%, and preferably greater than 35%, by weight.

Aqueous coating compositions may be prepared with the aqueous dispersion of the present invention using techniques that are well known in the coatings art. First, if the coating composition is to be pigmented, at least one pigment is typically well dispersed in an aqueous medium under high shear, such as is afforded by a Cowles mixer. Then, the aqueous dispersion of polymeric particles is added under lower shear stirring, along with other coating adjuvants as desired. Alternatively, the aqueous dispersion of polymeric particles may be included in the pigment dispersion step. The aqueous coating composition may contain conventional coating adjuvants, such as, for example, tackifiers, pigments, emulsifiers, crosslinkers, coalescing agents, buffers, neutralizers, thickeners or rheology modifiers, humectants, wetting agents, biocides, plasticizers, antifoaming agents, colorants, waxes, and anti-oxidants. The aqueous coating composition can contain up to 50%, by weight based on the weight of the polymeric particles, of an emulsion polymer not meeting the description of the aqueous dispersion of polymeric particles of the present invention, such as a film-forming and/or a non-film-forming emulsion polymer.

The solids content of the aqueous coating composition may be from 10% to 85% by volume. The viscosity of the aqueous coating composition may be from 0.05 to 2000 Pa·s (50 cps to 2,000,000 cps), as measured using a Brookfield viscometer; the viscosities appropriate for different end uses and application methods vary considerably.

In certain embodiments, particles including one or more voids provide such coating compositions, while concurrently reducing the mass of the particles, thereby reducing the energy which would have been expended in providing that mass.

The aqueous coating composition is suitable for use, when dry, as a coating, "coating" herein including, for example, paint, clearcoat, topcoat, primer, paper coating, leather coating, textile and nonwoven fabric coating and saturant, elastomeric coating, caulk, sealant, and adhesive.

The aqueous coating composition may be applied by conventional application methods such as, for example, brush or paint roller, air-atomized spray, air-assisted spray, airless spray, high volume low pressure spray, air-assisted airless spray, and electrostatic spray.

The aqueous coating composition can be applied to a substrate such as, for example, plastic including sheets and films, glass, wood, metal such as aluminum, steel, and phosphate or chromate-treated steel, previously painted surfaces, weathered surfaces, cementitious substrates, and asphaltic substrates, with or without a prior substrate treatment such as a primer. The aqueous composition coated on the substrate is typically dried, or allowed to dry, at a temperature from 10° C. to 200° C.

The following examples are presented to illustrate the invention. In the examples, the following abbreviations have been used.

AIBN is azoisobutylnitrile.
APS is Ammonium Persulphate.
AESH.HCl is 2-aminoethanethiol hydrochloride.
APhSH is 4-amino thio phenol.
BA is Butyl Acrylate.
CoBF is $Co(II)-(2,3-dioxyiminobutane-BF_2)_2$.
DI is Deionized.
EtOH is alcohol.
ICEMA is 2-isocyanatoethyl Methacrylate.
HEMA is Hydroxyethylmethacrylate.
HEA is Hydroxyethylacrylate.
IAA is isoascorbic acid.
NIPAM is N-isopropyl Acrylamide.
MAM is Methacrylamide.
MAA is Methacrylic Acid.
MMA is Methyl Methacrylate.
SDS is sodium dodecylbenzenesulfonate (23%).
t-BHP is t-Butyl Hydroperoxide (70%).
CTA is chain transfer agent.
L is liter; ml is milliliter; wt is weight; vol is volume; g is gram; min is minute; hr is hour. Theoretical Molecular Weight is number average molecular weight calculated as: Theoretical Molecular Weight=molecular weight of the CTA+(g of monomer)/(g of CTA)

Test Methods
Solids Content:
% Total Solids is determined by weight-loss. A sample is weighed into an aluminum pan, heated to drive off volatiles, cooled, and weighed again. The percent total solids is then calculated from the difference in weights.

Particle Size:
Measurements were made by CHDF using Matec CHDF-2000 (capillary hydrodynamic fractionation); Matec Applied Sciences, Northborough, Mass.

Cloud Point:
The cloud point is determined by making a 1% by weight solution of the copolymerized macromer in water at 20° C., then slowing heating the copolymerized macromer solution with stirring until the solution turns cloudy or turbid. The cloud point determination of the copolymerized macromer should be done under similar conditions, such as pH and ionic strength, as will exist in the reaction medium during the emulsion polymerization to make the polymeric particles of the present invention. If the reaction medium used to the make the polymeric particles of the present invention will contain water-soluble solvents, then these solvents should be included at the same concentration in the water/macromer solution during the determination of the cloud point.

EXAMPLES

Example 1M

Formation of a Copolymerized Macromer from NIPAM

A 250 ml flask outfitted with a magnetic stirrer, a reflux condenser, a thermocouple, and a $N_2$-inlet was charged with 130 g EtOH, 0.7 g AIBN, 0.8 g AESH.HCl, and 79.38 g NIPAM. The flask was purged with $N_2$, then heated to 80° C., at which point the heating mantel was removed and air cooling was used to offset the exotherm and return the flask to 78° C. The temperature was held at 78° C. for 4 hrs, then cooled to room temperature. 1.13 g of ICEMA was added to the flask. After standing overnight, the solids were determined to be 37.0%. The copolymerized macromer was determined to have a cloud point of 28° C.

Examples 2M to 9M

Formation of a Copolymerized Macromer

A 500 ml flask outfitted with a magnetic stirrer, a reflux condenser, a thermocouple, and a $N_2$-inlet was charged with 220 g EtOH, 1.6 g AIBN. For a Theoretical Molecular Weight of 5000 g/mol, 1.72 g of AESH.HCL was added to the flask; for a Theoretical Molecular Weight of 10000 g/mol, 0.86 g of AESH.HCL was added to the flask; and for a Theoretical Molecular Weight of 20000 g/mol, 0.43 g of AESH.HCL was added to the flask. For each copolymerized macromer composition, the mass of each monomer was added as indicated in TABLE 1. The flask was purged with $N_2$, then heated to 78° C., at which point the heating mantel was removed and air cooling was used to offset the exotherm and return the flask to 78° C. The temperature was held at 78° C. for 4 hrs, then cooled to room temperature. For a Theoretical Molecular Weight of 5000 g/mol, 3.2 g of ICEMA was added to the flask; for a Theoretical Molecular Weight of 10000 g/mol, 1.6 g of ICEMA was added to the flask; and for a Theoretical Molecular Weight of 20000 g/mol, 0.8 g of ICEMA was added to the flask. After standing overnight, the solids were determined to be 37.0%.

TABLE 1

| Copolymerized macromer | Molar ratio (mole %) | Mass (g) | Theoretical Molecular Weight (g/mol) | Cloud point (Celsius) |
|---|---|---|---|---|
| 2M pNIPAM co MAA | NIPAM:90, MAA:10 | NIPAM:68.1, MAA:5.2 | 10 000 | 30/35 |
| 3M pNIPAM co MAA | NIPAM:80, MAA:20 | NIPAM:56.0, MAA:10.6 | 10 000 | 50/55 |
| 4M pNIPAM co HEA | NIPAM:50, HEA:50 | NIPAM:37.3, HEA:38.3 | 10 000 | 30 |
| 5M pNIPAM co HEA | NIPAM:25, HEA:75 | NIPAM:19.8, HEA:60.9 | 5 000 | 55/60 |
| 6M pNIPAM co HEA | NIPAM:25, HEA:75 | NIPAM:19.8, HEA:60.9 | 10 000 | 55/60 |
| 7M pNIPAM co HEA | NIPAM:25, HEA:75 | NIPAM:19.8, HEA:60.9 | 20 000 | 40 |
| 8M pHEMA co HEA | HEMA:75, HEA:25 | HEMA:64.4, HEA:19.2 | 10 000 | 40/45 |
| 9M pHEMA co MAM | HEMA:70, MAM:30 | HEMA:56.5, MAM:15.8 | 10 000 | 30 |

Example 10M

Formation of a Copolymerized Macromer

A 250 ml flask outfitted with a magnetic stirrer, a reflux condenser, a thermocouple, and a $N_2$-inlet was charged with 220 g EtOH, 1.6 g AIBN, 0.94 g APhSH, 0.45 g of acid acetic and 75 g NIPAM. The flask was purged with $N_2$, then heated to 78° C., at which point the heating mantel was removed and air cooling was used to offset the exotherm and return the flask to 78° C. The temperature was held at 78° C. for 4 hrs, then cooled to room temperature. 3.6 g of ICEMA was added to the flask. After standing overnight, the solids were determined to be 37.0%. The copolymerized macromer was determined to have a cloud point of 28° C.

Example 11M

Formation of a Copolymerized Macromer with CoBF

A 250 ml flask outfitted with a magnetic stirrer, a reflux condenser, a thermocouple, and a $N_2$-inlet was charged with 50 g Dioxane, 0.28 g of VAZO 52, 17.5 g HEMA and 5 g MAM and 7 g CoBF solution. The CoBF solution was made my mixing 0.005 of CoBF with 50 g of Dioxane. The flask was purged with $N_2$, then heated to 75° C., at which point the heating mantel was removed and air cooling was used to offset the exotherm and return the flask to 75° C. The temperature was held at 75° C. for 3 hrs, then cooled to room temperature. The copolymerized macromer was determined to have a cloud point of 28° C.

Example 1P

Formation of Polymeric Particles

A 250 ml flask was charged with 10.71 g of Example 1M and air was blown through the flask while stirring to remove the ethanol. 69.8 g water and 0.38 g Disponil FES-32 was added to the flask and stirring continued to dissolve the pNIPAM macromer. A monomer emulsion was made by combining 22.21 g water, 2.01 g Disponil FES-32, 37.1 g BA, and 34.2 g MMA. 6.13 g of the monomer emulsion was added to flask at room temperature, then the flask was purged with $N_2$ and heated to 85° C. 0.31 g APS in 2.5 g water was added to flask, and the flask was held at 85° C. for 10 min, then the rest of the monomer emulsion was fed in over 1 hr. The flask was held at 85° C. for 20 min after the feed was completed, then the reaction was chased with one addition of 0.41 g FeSO4 (1%) and two additions of 0.06 g tBHP/0.83 g water+0.025 g IAA/0.83 g water, with 15 min between chases. After cooling to room temperature, the particle size was measured as 310 nm.

Example 2P

Formation of Polymeric Particles

A 500 ml flask was charged with 120 g of water, 0.6 g of sodium carbonate and 0.76 g Disponil FES-32. A monomer emulsion was made by combining 33 g of water, 4.02 g Disponil FES-32, 74.2 g BA, 68.4 g MMA and 1.43 g of MAA. 12.26 g of the monomer emulsion was added to flask at room temperature, and then the flask was purged with $N_2$ and heated to 85° C. 0.62 g APS in 5 g water was added to flask and the flask was held at 85° C. for 10 min, and then 90% of the monomer emulsion was fed in over 1 hr. The flask was held at 85° C. for 20 min, then cooled to RT. 8 g of 2M macromer dissolved in 55 g of water added to the flask, then flask heated up to 85° C. The feed of the rest of monomer emulsion was terminated, the flask was held at 85° C. for 20 min after the feed was completed, then the reaction was chased with one addition of 0.82 g FeSO4 (1%) and two additions of 0.12 g tBHP/1.7 g water+0.05 g IAA/1.7 g water, with 15 min between chases. After cooling to room temperature, the particle size was measured as 180 nm, and solid content was 38.2%.

What is claimed is:

1. An aqueous dispersion of polymeric particles, the particles comprising:
   80% to 99.9% by weight, based on a weight of the polymeric particles, of at least one ethylenically unsaturated monomer; and
   0.1% to 20% by weight, based on the weight of the polymeric particles, of a copolymerized macromer, having a number average molecular weight of between 1,000 and 50,000 and a cloud point of a 1% by weight solution in water of between 27° C. to 85° C.;
   wherein the polymeric particles have an average particle diameter of 20 to 1000 nanometers, and
   wherein the copolymerized macromer is formed by polymerization of at least one monoethylenically unsaturated monomer in the presence of at least one chain transfer agent, where the chain transfer agent contains a reactive functionality X, to make a premacromer, and the premacromer is post reacted with an ethylenically unsaturated monomer which contains a complementary reactive functionality Y, such that X and Y will react to form a covalent bond.

2. The aqueous dispersion of claim 1 wherein the copolymerized macromer comprises an ethylenically unsaturated polymer of (meth)acrylates.

3. The aqueous dispersion of claim 1 wherein the copolymerized macromer comprises an ethylenically unsaturated copolymer made from at least one of N-isopropyl(meth)acrylamide, N-isopropyl(meth)acrylamide with (meth)acrylic acid, N-isopropyl(meth)acrylamide with hydroxyethyl acrylate, N-isopropyl(meth)acrylamide with (meth)acrylamide, and hydroxyethyl methacrylate with (meth)acrylamide.

4. The aqueous dispersion of claim 1 wherein the number average molecular weight comprises between 5,000 and 25,000.

5. The aqueous dispersion of claim 1 wherein the cloud point comprises between 35° C. and 70° C.

6. The aqueous dispersion of claim 1 wherein the polymeric particles comprise, when dry, at least one void.

7. The aqueous dispersion of claim 1 wherein the polymeric particles comprise a glass transition temperature from −30° C. to 30° C.

8. An aqueous coating composition comprising the aqueous dispersion of claim 1.

9. A process for forming an aqueous dispersion of polymeric particles comprising:
polymerizing from 80% to 99.9% by weight, based on a weight of the polymeric particles, of at least one ethylenically unsaturated monomer and from 0.1% to 20% by weight, based on the weight of the polymeric particles, of a copolymerized macromer, the copolymerized macromer having a number average molecular weight of between 1,000 and 50,000 and a cloud point of a 1% by weight solution in water of between 27° C. to 85° C.; and
forming at least a portion of a polymer containing the copolymerized macromer at a temperature above the cloud point, to provide the aqueous dispersion of polymer particles, wherein the polymeric particles have an average particle diameter of 20 to 1000 nanometers,
wherein the macromer is formed by polymerization of at least one monoethylenically unsaturated monomer in the presence of at least one chain transfer agent, where the chain transfer agent contains a reactive functionality X, to form a premacromer, and
wherein the process further comprises post reacting the premacromer with an ethylenically unsaturated monomer which contains a complementary reactive functionality Y, such that X and Y will react to form a covalent bond.

10. The process of claim 9 wherein the polymerizing comprises:
introducing the copolymerized macromer in the presence of the at least one ethylenically unsaturated monomer to form the polymer, the polymer being a copolymer of copolymerized macromer and the ethylenically unsaturated monomer.

11. The aqueous dispersion of claim 1 wherein the copolymerized macromer comprises an ethylenical unsaturation terminal to the copolymerized macromer, and wherein the unsaturation has the structure

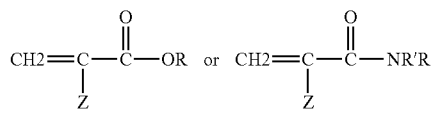

wherein Z is the polymer chain and R and R' are, independently, H, an alkyl group, or an aryl group.

12. The process of claim 9 wherein the copolymerized macromer comprises an ethylenical unsaturation terminal to the copolymerized macromer, and wherein the unsaturation has the structure

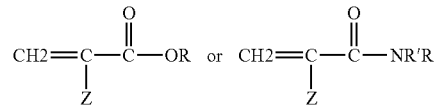

wherein Z is the polymer chain and R and R' are, independently, H, an alkyl group, or an aryl group.

13. The process of claim 9, wherein the copolymerized macromer comprises an ethylenically unsaturated copolymer made from at least one of N-isopropyl(meth)acrylamide, N-isopropyl(meth)acrylamide with (meth)acrylic acid, N-isopropyl(meth)acrylamide with hydroxyethyl acrylate, N-isopropyl(meth)acrylamide with (meth)acrylamide, and hydroxyethyl methacrylate with (meth)acrylamide.

14. The aqueous dispersion of claim 1, wherein the copolymerized macromer has a cloud point of a 1% by weight solution in water of between 35° C. and 70° C.

15. The aqueous dispersion of claim 1, wherein reactive functionalities X and Y are selected pairwise from amines and isocyanates, amines and isothiocyanates, amines and acid halides, amines and epoxies, amines and thioranes, amines and acetoacetates, amines and anhydrides, alcohols and isocyanates, alcohols and acid halides, alcohols and anhydrides, carboxylic acids and epoxies, carboxylic acids and thioranes, carboxylic acids and aziridines, carboxylic acids and carbodiimides, acetoacetates and amines, acetoacetates and aldehydes, and aldehydes and acetoacetates.

16. The aqueous dispersion of claim 1, wherein the chain transfer agent containing reactive functionality X and the ethylenically unsaturated monomer which contains complementary reactive functionality Y are selected pairwise from 2-aminoethanethiol hydrochloride and 2-isocyanatoethylmethacrylate; 2-(butylamino)ethanethiol hydrochloride and glycidol methacrylate; 4-aminophenylthiol and methacryloyl chloride; 2,2,2-trichloroethanol and 2-isocyanatoethyl methacrylate; and 3-mercaptopropyl acetoacetate and acrolein.

17. The process of claim 9, wherein reactive functionalities X and Y are selected pairwise from amines and isocyanates, amines and isothiocyanates, amines and acid halides, amines and epoxies, amines and thioranes, amines and acetoacetates, amines and anhydrides, alcohols and isocyanates, alcohols and acid halides, alcohols and anhydrides, carboxylic acids and epoxies, carboxylic acids and thioranes, carboxylic acids and aziridines, carboxylic acids and carbodiimides, acetoacetates and amines, acetoacetates and aldehydes, and aldehydes and acetoacetates.

18. The process of claim 9, wherein the chain transfer agent containing reactive functionality X and the ethylenically unsaturated monomer which contains complementary reactive functionality Y are selected pairwise from 2-aminoethanethiol hydro chloride and 2-isocyanatoethylmethacrylate; 2-(butylamino)ethanethiol hydrochloride and glycidol methacrylate; 4-aminophenylthiol and methacryloyl chloride; 2,2,2-trichloroethanol and 2-isocyanatoethyl methacrylate; and 3-mercaptopropyl acetoacetate and acrolein, respectively.

* * * * *